(12) United States Patent
Warren et al.

(10) Patent No.: US 6,560,942 B2
(45) Date of Patent: May 13, 2003

(54) OPEN LATTICE, FOLDABLE, SELF DEPLOYABLE STRUCTURE

(75) Inventors: Peter A. Warren, Newton, MA (US); Jason D. Hinkle, Superior, CO (US)

(73) Assignee: Foster-Miller, Inc., Waltham, MA (US)

( * ) Notice: Subject to any disclaimer, the term of this patent is extended or adjusted under 35 U.S.C. 154(b) by 10 days.

(21) Appl. No.: 10/021,526

(22) Filed: Oct. 30, 2001

(65) Prior Publication Data

US 2002/0124518 A1 Sep. 12, 2002

Related U.S. Application Data

(63) Continuation-in-part of application No. 09/587,810, filed on Jun. 6, 2000, now Pat. No. 6,345,482.

(51) Int. Cl.[7] .............................................. E04H 12/18
(52) U.S. Cl. ........................ 52/646; 52/664; 52/651.07
(58) Field of Search ................. 52/646, 664, 651.07, 52/651.11, DIG. 10

(56) References Cited

U.S. PATENT DOCUMENTS

| | | |
|---|---|---|
| 187,078 A | 2/1877 | Adams |
| 940,399 A | 11/1909 | Mueser |
| 1,026,801 A | 5/1912 | Haase |
| 1,971,500 A | 8/1934 | Palmer |
| 1,981,938 A | 11/1934 | Anderson |
| 2,210,833 A | 8/1940 | Clough |
| 2,461,916 A | 2/1949 | Omar |
| 2,695,795 A | 11/1954 | Tamminga |
| 2,960,924 A | 11/1960 | Grott |
| 3,035,708 A | 5/1962 | Freeman |
| 3,326,497 A | 6/1967 | Michelson |
| 3,459,391 A | 8/1969 | Haynos |
| 3,460,992 A | 8/1969 | Avilov et al. |
| 3,473,758 A | 10/1969 | Webb |
| 3,477,662 A | 11/1969 | Anderson |
| 3,612,287 A | 10/1971 | Maltese |
| 3,652,935 A | 3/1972 | Shaw |
| 3,757,476 A | 9/1973 | Schoen |
| 3,818,948 A | 6/1974 | Hedges |
| 3,875,711 A | 4/1975 | Palmer |
| 4,030,102 A | 6/1977 | Kaplan et al. |
| 4,137,686 A | 2/1979 | Kern |
| 4,145,765 A | 3/1979 | Malone |
| 4,250,679 A | 2/1981 | Burg |
| 4,259,821 A | 4/1981 | Bush |
| 4,334,391 A | 6/1982 | Hedgepeth et al. |
| 4,365,908 A | 12/1982 | Thiboutot |
| 4,417,427 A | 11/1983 | Bschorr |
| 4,453,353 A | 6/1984 | Killop et al. |
| 4,574,553 A | 3/1986 | Lisec |
| 4,579,302 A | 4/1986 | Schneider et al. |
| 4,603,521 A | 8/1986 | Engelhart |
| 4,614,502 A | 9/1986 | Nelson |
| 4,655,022 A | 4/1987 | Natori |
| 4,686,134 A | 8/1987 | Ono |
| 4,723,579 A | 2/1988 | Hyodo et al. |
| 4,778,184 A | 10/1988 | Fleischer |
| 5,167,160 A | 12/1992 | Hall, II |

(List continued on next page.)

*Primary Examiner*—Carl D. Friedman
*Assistant Examiner*—Naoko Slack
(74) *Attorney, Agent, or Firm*—Iandiorio & Teska; R. Stephen Rosenholm; Kirk Teska

(57) ABSTRACT

An open-lattice, foldable, self-deployable structure with a number of spaced, bendable longitudinal members each having a curved cross section forming cells each bounded by a portion of two spaced longitudinal members and two spaced diagonal members. The diagonal members are joined to the longitudinal members at the cell boundary intersections of the diagonal members and the longitudinal members. The longitudinal members are made of a material which bends and flattens by a predetermined amount below the material's yield point and the diagonal members are made of a material which both bends and twists by a predetermined amount below the material's yield point so that the structure can be collapsed and then self resurrected.

18 Claims, 12 Drawing Sheets

U.S. PATENT DOCUMENTS

| | | |
|---|---|---|
| 5,228,644 A | 7/1993 | Garriot et al. |
| 5,366,012 A | 11/1994 | Lohbeck |
| 5,390,463 A | 2/1995 | Sollner |
| 5,664,380 A | 9/1997 | Hsueh |
| 5,804,277 A | 9/1998 | Ashbee |
| 5,921,048 A | 7/1999 | Francom et al. |
| 5,924,745 A | 7/1999 | Campbell |
| 5,977,932 A | 11/1999 | Robinson |
| 6,028,570 A | 2/2000 | Gilger et al. |
| 6,178,702 B1 | 1/2001 | Hand et al. |

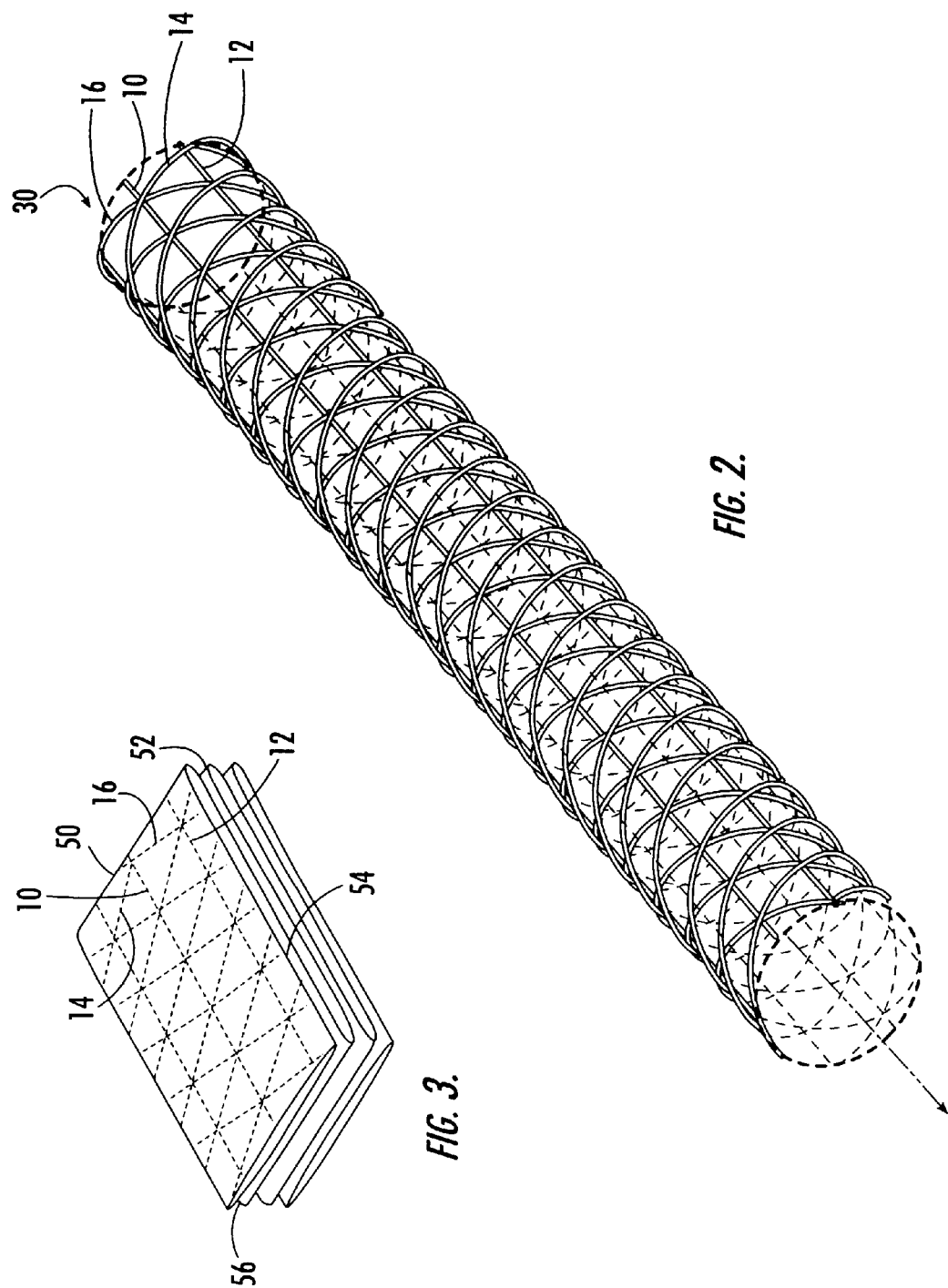

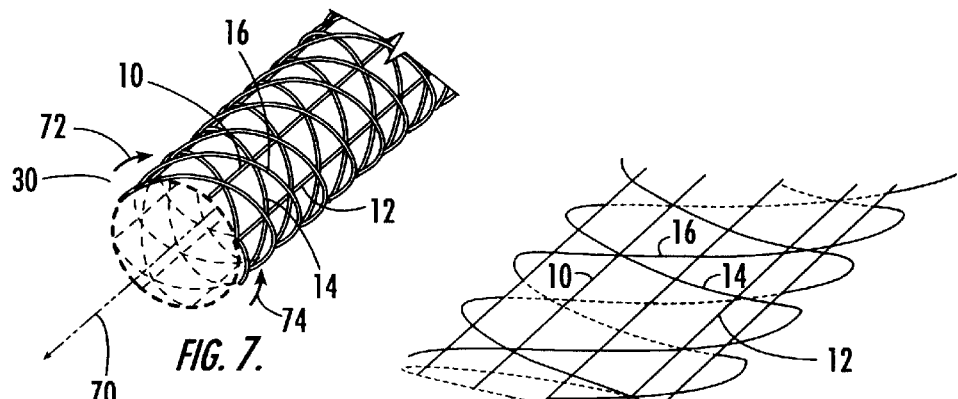
FIG. 7.
FIG. 8.
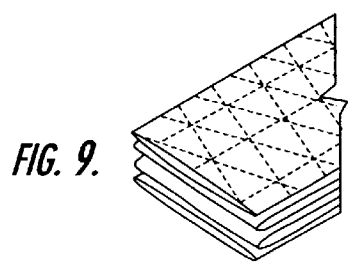
FIG. 9.
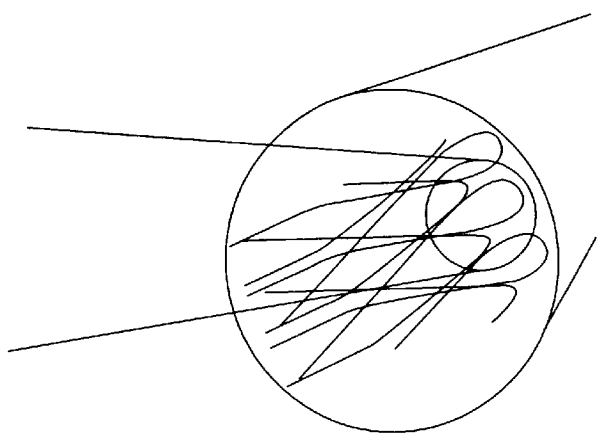
FIG. 10.
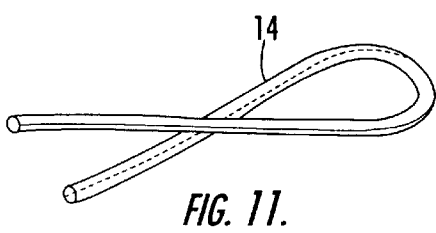
FIG. 11.

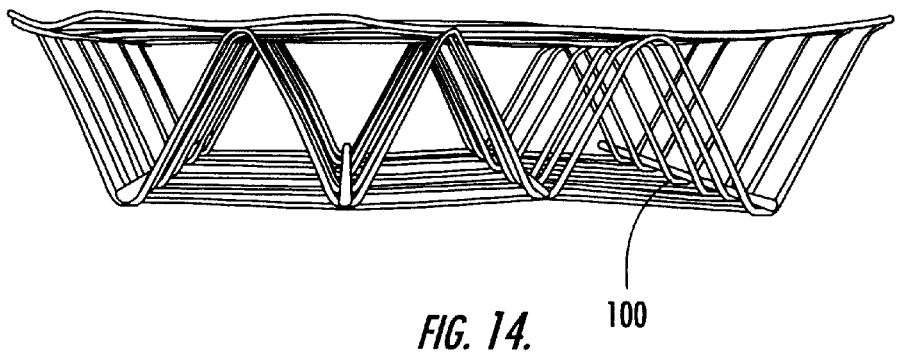
FIG. 14.    100
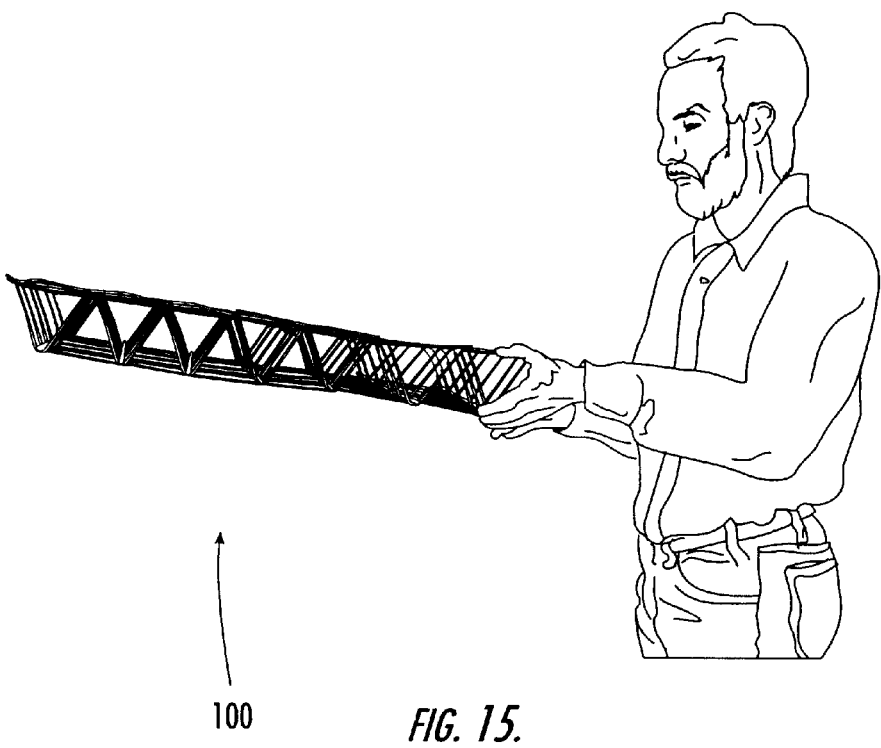
100    FIG. 15.

OPEN LATTICE, FOLDABLE, SELF DEPLOYABLE STRUCTURE

PRIORITY CLAIM

This application is a continuation-in-part of application Ser. No. 09/587,810 filed Jun. 6, 2000 now U.S. Pat. No. 6,345,482 published Feb. 12, 2002.

FIELD OF THE INVENTION

This invention features an open-lattice, foldable, self-deployable structure which can be used for solar sails, heat shields, communication devices, sensors and sensor arrays, power generation devices, and the like.

BACKGROUND OF THE INVENTION

Ultra-light weight, large spacecraft structures can be used for a variety of purposes including solar sails, heat shields, communication devices, power generation devices, and the like. The structures must be compatible for deployment, self deployable, and upon deployment, sufficiently rigid and stable and unfolding to a shape exactly the same as it was before it was folded compactly for deployment in space. In the prior art, mechanical systems and inflatable systems were used.

Mechanical deployment systems are among the best understood of prior art spacecraft mechanisms. See U.S. Pat. No. 4,579,302 incorporated herein by this reference. Virtually all spacecraft mechanically deploy at least one component to gather solar power, radiate heat, or act as an antenna. Because of their mission critical nature, these systems have been designed for extreme reliability with margins of safety to accommodate variations in manufacture, changes in lubrication states, and other factors.

Mechanical systems, however, have both theoretical and practical limitations that make it difficult to apply them to ultra-low density requirements of lightly loaded structures. In a mechanical deployment system, the mechanisms that provide the deployment become parasitic mass once the deployment is complete. The hinge or latch mechanisms of these mechanical systems are also generally structurally inefficient and there are practical limitations to how small such a mechanism can reasonably be fabricated and still be reliable. Moreover, the parasitic mass added by the hinges, latches, and actuators reduces overall system performance, limiting the acceleration of solar sails, for example. Finally, the coiled longeron and cable tension systems currently developed and representative of the state of the art in mechanical packaging density generally attain, at best, a length-to-packing ratio of approximately 20 to 1. For a 500 meter boom, this means that the stowed length of the structure would approach 25 meters, exceeding the payload envelope of all existing launch systems.

For several types of spacecraft structures, the loads on the structure are extremely small once the spacecraft is in its final orbit. These forces, typically 2 to 20 lbs., are typically far below the load limit of the structure deployed solar array, sensor, antenna, etc. This means that the structure is more massive than it theoretically has to be, thus increasing the costs of delivering the spacecraft. To reduce the launch mass and thus launch cost of future spacecraft, recent research has proposed to develop "Gossamer" spacecraft that take advantage of the very light loading environment of space and reduce structural mass and thus launch costs.

To meet the needs of Gossamer spacecraft missions and to rectify the shortcomings of mechanical deployment systems, various government and commercial organizations have been investigating the use of inflatable membranes as structural elements. See, for example, U.S. Pat. No. 3,477,622.

These systems use a thin film membrane that is pressurized in space by either a compressed or chemically stored gas. Once the desired shape has been achieved, the membrane supports the structural loads and either the original inflatant gas or a secondary rigidization system holds the structure in shape. Although such inflatable systems offer the potential of very low mass and very high packaging efficiency for missions that have low ultimate load requirements, there are again both theoretical and practical limitations that have thus far proven to be significant limitations to the use of inflatable systems as compressive structural elements.

In order for a columnar member to be inflated, it must include a continuous pressure vessel so that it will contain the inflatant gas. But, in order for it to be a mass efficient compression column, it must have extremely thin walls. The combination of these requirements leads to very thin membranes in which surface imperfections dominate the local structural behavior. Prior research has shown that the effects of even minor localized deviations from the ideal shape can greatly reduce the stiffness and strength of the resultant column.

Moreover, inflatable structures suffer from the limitation that low level leaks and micro-meteoroid punctures can eventually drain the gas to the point that the structures can no longer hold their shape.

In order to overcome the problems associated with gas leaks and punctures, aluminum based films have been used requiring very large quantities of gas to provide the internal pressure necessary to yield the wall material even when it is very thin. Moreover, the gas used to provide this internal pressure adds to the non-structural launch mass of the system. Compounding this mass problem is the issue that it is difficult to exactly control the yield point of many thousands of square feet of thin film material. As some parts of the film yield past their desired shape, others haven't started to yield yet. The result is an imperfect shape, inadequate performance, and reduced mission reliability.

To avoid these problems, several developers of light weight inflatable columns have developed techniques to rigidized the inflated shape using resin systems that are cured to hard shape in orbit, once the deployment is complete. The limitations of these systems center on the mass and reliability penalties associated with doing complex material processing in the remote, zero-g space environment. Since the resin system must be consolidated and cured in orbit, a variety of challenges must be overcome. First, the resin must maintain its character for as long as two years of storage and withstand the high temperatures of the launch pad. Second, the resin must be consistently and reliably distributed throughout the column. The third requirement is that there must be some means to cure the epoxy which must also be light weight and reliable. Resins cured by ultraviolet light provided by the sun have low glass transition temperatures and thus are prone to strength loss at the operating temperatures and degradation after continued exposure. Solvent loss based systems have a fairly large mass penalty associated with them since large amounts of non-structural solvent must be carried as part of the mass launch. Also, in orbit, thermal cure systems require substantial amounts of energy and require the additional, non-structural mass of resistive heaters and insulation.

Finally, these techniques suffer from the limited ability to verify their function on the ground. Since the rigidization of a material, either by yielding it or by solidifying a resin system is generally a one-time process, extreme and expensive methods must be undertaken to ensure that the process will proceed as planned.

The advantage of open lattice isogrid tubular structures are known, but such prior art structures are made of rigid members and thus they cannot be folded into a compact package for space deployment. See Mikulas Jr., Martin, M., NASA Technical Memorandum 78687, *Structural Efficiency of Long Lightly Loaded Truss and Isogrid Columns for Space Applications* (July 1978). U.S. Pat. No. 5,977,932, incorporated herein by this reference, reports studies concerning self-deploying helical structure antennas made of helical strips and rings. This structure has poor structural qualities when compared to isogrid structures and thus requires mechanical booms (see FIGS. 4–17) for mechanical strength.

SUMMARY OF THE INVENTION

It is therefore an object of this invention to provide a foldable, self-deployable open lattice structure.

It is a further object of this invention to provide such a structure which is reliable.

It is a further object of this invention to provide such a structure which does not require any hinge, latch, or actuator mechanisms which would add parasitic mass to the structure.

It is a further object of this invention to provide such a structure which can be manufactured at a cost substantially less than structures including expensive and complex hinge, latch, and actuator mechanisms.

It is a further object of this invention to provide such a structure capable of a length-to-packing ratio much greater than prior art mechanical systems.

It is a further object of this invention to provide such a structure which overcomes the problems associated with imperfections in prior art inflatable systems.

It is a further object of this invention to provide such a structure which maintains the proper shape upon deployment.

It is a further object of this invention to provide such a structure which is not susceptible to leaks or micrometeoroid punctures.

It is a further object of this invention to provide such a structure which does not require an inflating gas for deployment.

The invention results from the realization that, contrary to conventional wisdom, structural members made of composite materials can be designed to bend and even twist to a point below the material's yield point and that the advantages of open-lattice structures can be fully realized and made foldable for compact storage and made self-deployable if the longitudinal composite members are made bendable and if the diagonal composite members are made both bendable and twistable. This invention results from the further realization that if the longitudinal members have a curved cross section, the strength of the resulting structure is increased.

Once such a structure is fabricated, it can be folded or rolled into a compact shape for storage during deployment and then once in position in space released whereupon the structure resurrects itself automatically to the exact shape it was before folding to deploy solar sails, heat shields, communication devices, power generation devices, and the like.

This invention features an open-lattice, foldable, self-deployable structure comprising a plurality of spaced, bendable and twistable diagonal members disposed to span between and intercept longitudinal members having a curved cross section thereby forming cells, each cell being bounded by a portion of two spaced longitudinal members and two spaced diagonal members; and means for joining the diagonal members to the longitudinal members at the cell boundary intersections of the diagonal members and the longitudinal members. The curved longitudinal members are made of a material which bends by a predetermined amount below the material's yield point and the diagonal members are made of a material which both bends and twists by a predetermined amount below the material's yield point so that the structure can be collapsed and then self-resurrected. The curved cross section longitudinal members may be made by thermoforming axially running fibers in a resin matrix.

The longitudinal members and the diagonal members are typically made of a composite material including fibers in a resin matrix. The resin matrix may be thermoplastic material. The cells may have the shape of isosceles triangles when the structure is in the shape of a cylinder having a longitudinal axis, the longitudinal members typically extending along the direction of the longitudinal axis and the diagonal members include one set which extend around the cylinder in a first direction and another set which extend around the cylinder in a second direction.

The longitudinal members are typically continuous from one end of the cylinder to the other. The diagonal members are also typically continuous from one end of the cylinder to the other. The cells may be triangular in shape, the apexes of each cell each including a portion of two diagonal members intersecting the longitudinal members.

The means for joining the diagonal members may include an adhesive securing the diagonal members to the longitudinal members. If the diagonal members and the longitudinal members are made of a composite material including fibers, the means for joining preferably includes the fibers of a longitudinal member inter-woven with the fibers of a diagonal member. A resin or heat weld secures the woven fibers at the joints between the longitudinal members and the diagonal members.

The open lattice, foldable, self deployable structure of this invention may be embodied in structural shapes other than columns including trusses and other three-dimensional lattice structures.

BRIEF DESCRIPTION OF THE DRAWINGS

Other objects, features and advantages will occur to those skilled in the art from the following description of a preferred embodiment and the accompanying drawings, in which:

FIG. 2 is a schematic view of a open-lattice, foldable, self deployable cylindrical tube structure in accordance with the subject invention;

FIG. 3 is a schematic showing the structure of FIG. 2 in its folded compact configuration;

FIG. 7 is another view of a tubular-shaped, open-lattice, foldable, self-deployable structure made of composite longitudinal and diagonal members in accordance with the subject invention;

FIG. 8 is a schematic view showing the structure of FIG. 7 in a flattened configuration;

FIG. 9 is a schematic view showing the structure of FIG. 8 in a folded configuration;

FIG. 10 is a schematic top view showing the bending and twisting of the diagonal members of the diagonal members of the structure shown in FIGS. 7–9 during the flattening and folding operations depicted in FIGS. 8 and 9;

FIG. 11 is a schematic view of a single diagonal member of FIG. 7;

FIGS. 14–15 are views of a non-columnar open lattice structure in accordance with this invention;

DISCLOSURE OF THE PREFERRED EMBODIMENT

Figure 1:
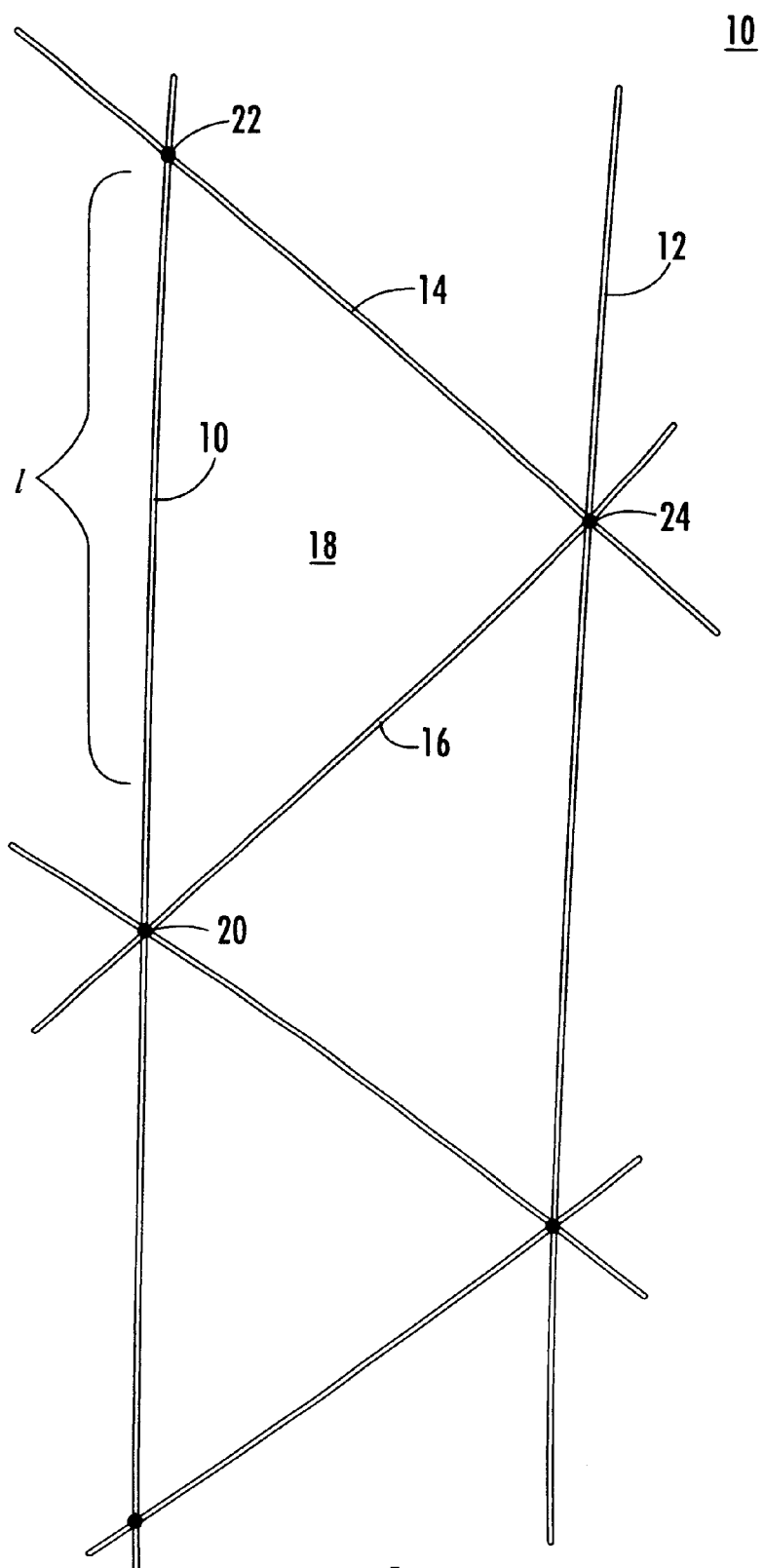
FIG. 1 is a front view of a portion of an open-lattice, foldable, self-deployable structure in accordance with the subject invention.
Figure 12:
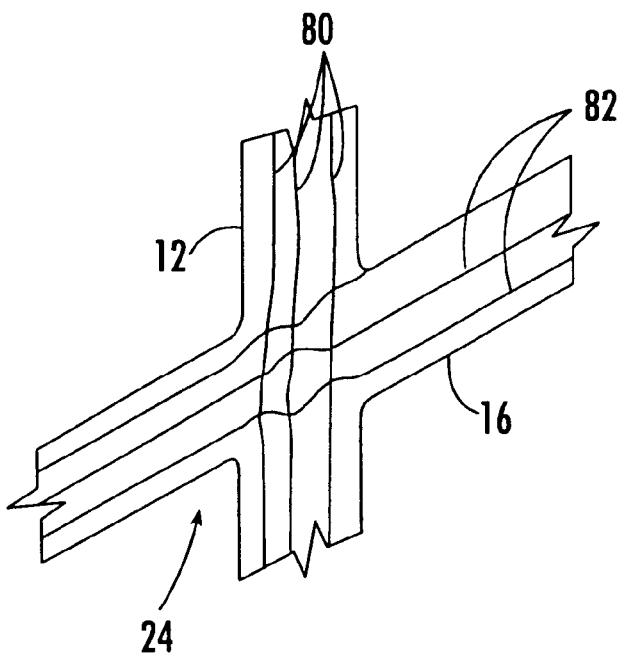
FIG. 12 is a schematic view showing one embodiment of the means for joining the diagonal members of the structure shown in FIGS. 1, 2, and 7 to the longitudinal members at selected cell boundary intersections thereof.

Structure 10, FIG. 1 includes spaced longitudinal members 10, 12 and spaced diagonal members 14, 16 as shown spanning between longitudinal members 10 and 12. Thus, structure 10 is an open-lattice structure including open cells such as cell 18 bounded by portions of longitudinal members 10 and 12 and diagonal members 14 and 16. There are some means for joining diagonal members 14 and 16 to longitudinal members 10 and 12 at selected cell boundary intersection points 20, 22, and 24. Such means include adhesives, pins, rivets, and the like or as discussed infra respect to FIG. 12.

The cells may take the shape of an isosceles triangle as shown for cell 18 with apexes 20, 22, and 24 each including the intersection of two diagonal members 14 and 16 with a longitudinal member 10, 12 although this is not a necessary limitation of the present invention.

NASA Technical Memorandum 78687, hereby incorporated herein by this reference, discusses the mechanical characteristics of such structures in general. Note, however, that the isogrid wall structure described therein was never actually fabricated. Instead, it was a theoretically described structure that was used to analytically predict the potential performance. No method for folding the structure was developed and instead the structure was intended to be fabricated once placed in orbit. In the prior art, however, longitudinal members 10 and 12 and diagonal members 14 and 16 were made of a material which did not bend or twist very much if at all before yielding.

In the subject invention, in contrast, longitudinal members 10 and 12 are designed to and made of a material which bends by a predetermined amount below the material's yield point and diagonal members 14 and 16 are designed to and made of a material which both bends and twists by predetermined amounts below the material's yield point. So, for example, longitudinal members 10 and 12 can bend by as much as 180° without yielding and diagonal members 14 and 16 can bend by as much as 180° and twist by as much as 90° without yielding.

In this way, open-lattice tubular structure 30, FIG. 2 which includes continuous longitudinal members 10 and 12 and continuous diagonal members 14 and 16 and others, as shown, can be constructed to collapse and fold as depicted in FIG. 3, and then released whereupon structure 30 automatically returns to the shape shown in FIG. 2. Thus, no actuators are required. This is in sharp contrast with U.S. Pat. No. 5,977,932 which does not have any longitudinally extending members which fold and which thus lacks the necessary structural rigidity to form a viable structure.

Figure 4:
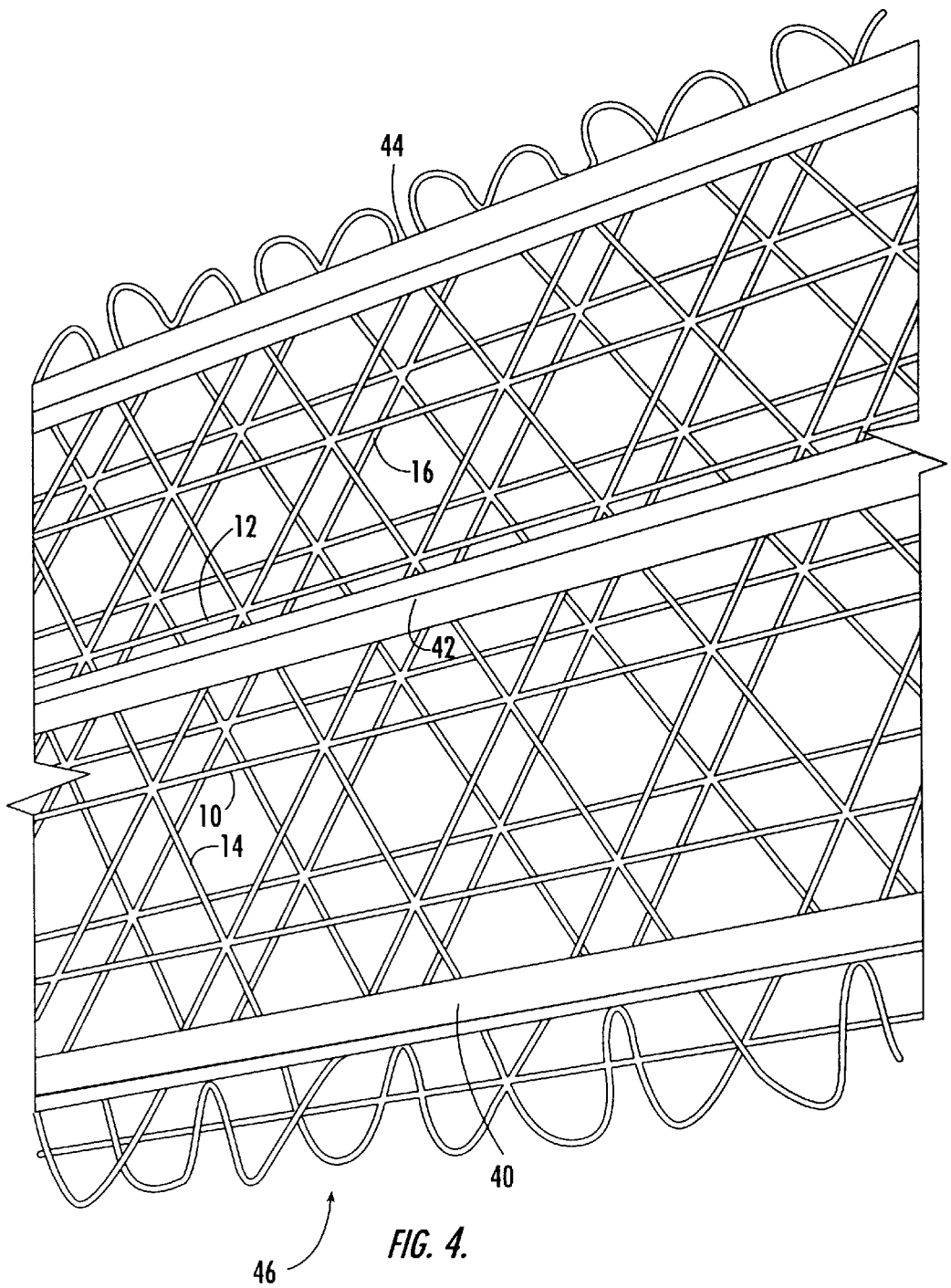
FIG. 4 is a top schematic view of the structure shown in FIG. 2 collapsed to a flat configuration prior to folding.

As shown in FIG. 4, structure 30, FIG. 2 is compressed flat via the weight of metal bars 40, 42, and 44 whereupon diagonal members 14 and 16 both fold and twist as shown at 46 and 48. When this flattened structure is folded as shown in FIG. 3, longitudinal members 10 and 12 fold along fold lines 50, 52, and diagonal members 14 and 16 fold along fold lines 54 and 56.

Figure 5:
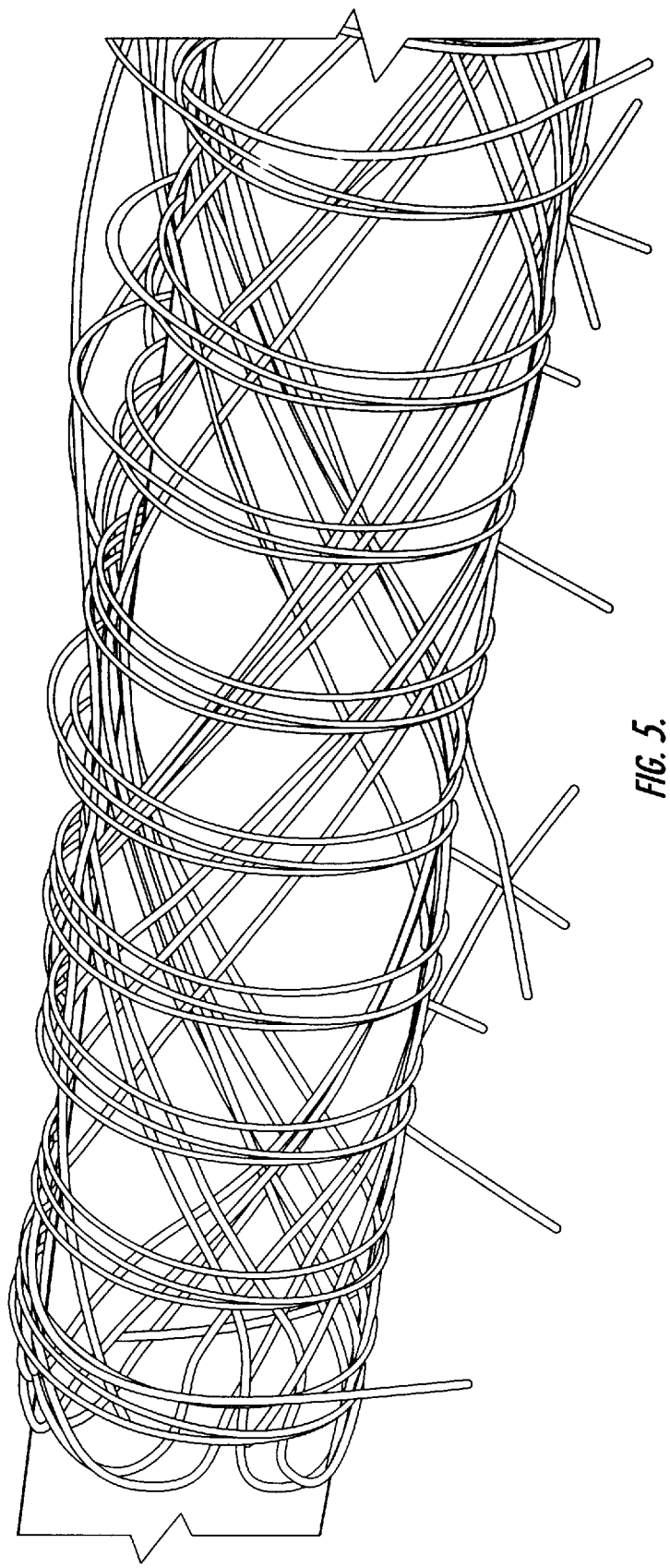
FIG. 5 is a schematic view of the structure shown in FIG. 2 rolled about a mandrel for storage.
Figure 6:
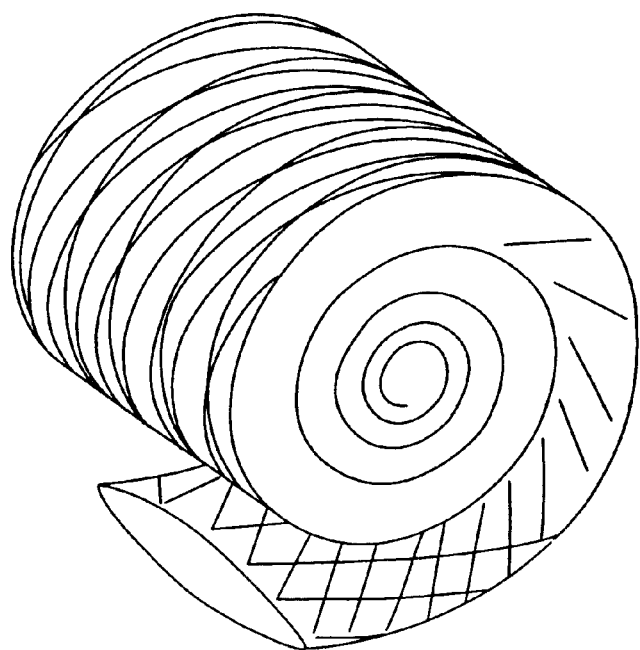
FIG. 6 is a schematic view of the structure shown in FIG. 2 coiled for storage.

Another way to render structure 30, FIG. 2 compact for storage is by rolling it on mandrel 60, FIG. 5. Alternatively, the flat structure as shown in FIG. 4 can be coiled as shown in FIG. 6.

In the preferred embodiment, FIG. 7, longitudinal members 10 and 12 and diagonal members 14 and 16 are made of a composite material including unidirectional, biased, or braided fibers or tows of fibers in a flexible resin matrix such as a thermoplastic material. Cylinder 30 has longitudinal axis 70 and longitudinal members 10 and 12 extend in the direction of axis 70. The fibers of these members generally run in the direction of axis 70. One set of diagonal members, as shown for diagonal member 16, wrap around cylinder 30 in the direction shown by arrow 72 at an angle transverse to axis 70 while diagonal member 14 wraps around cylinder 30 in a different direction shown by arrow 74 also transverse to axis 70. The fibers of these members also generally run in the direction of the length of each member before it is wrapped around cylinder 30.

As shown in FIG. 2, both the longitudinal members 10, 12 and the diagonal members 14, 16 are continuous and extend from one end of the cylinder to the other, although this is not a necessary limitation of the subject invention.

Structure 30, FIG. 7 is flattened, FIG. 8 by gently bending diagonal members 14, 16 and by allowing them twist as shown in FIGS. 10–11 without failure. The flattened structure can then be folded by bending longitudinal members 10, 12, FIG. 9.

In the preferred embodiment, structure 30, FIGS. 2 and 7 is a braided composite structure. Thus, each of the longitudinal members as shown for longitudinal member 12, FIG. 12 and each of the diagonal members as shown for diagonal member 16 includes a ply or a number of plies of lengthy unidirectional fibers 80, 82, respectively, in a thermoplastic resin matrix. In this embodiment, the means for joining the diagonal members to the longitudinal members at selected cell boundary interception points such as at joint 24 is the weave of fibers 80 and 82 shown in FIG. 12.

One prototype of structure 30, FIG. 2, was 3 feet long, 14 inches in diameter and made of flat 0.010 inch thick and 0.0625 inch wide longitudinal and diagonal composite members each including carbon fiber in a thermoplastic resin matrix material. The free length l, FIG. 1 of each diagonal and longitudinal member is about 3½ inches.

Those skilled in the art will understand that for specific structural designs, the composition, fiber orientation, matrix material, thickness, and width or diameter, the number of longitudinal and diagonal members, the free length between intersections of the longitudinal and diagonal members, and the intersection angle are all design variables to be taken into account. And, materials other than composites, such as metals and plastics, may be used for the longitudinal and diagonal members, provided the longitudinal members are bendable by a predetermined amount for folding before yielding.

The skilled designer will ensure that the structure can be flattened, folded, and/or rolled without any material yielding so that it self-resurrects itself and is thus self-deployable. Tradeoffs include weight, density, flexibility, and strength, both in compression and in shear. The structure can range from a few centimeters to many meters in diameter and thousands of meters in length and is able to carry compression loads of 5 to 200 pounds or more. Shapes other than tubular shapes are also possible in accordance with this invention.

Thus, in accordance with this invention, open-lattice, foldable, self-deployable structure 10, FIG. 1 and structure 30 FIGS. 2 and 7 are reliable and do not require any hinge, latch, or actuator mechanisms which would add parasitic mass to the structure. The structure can be manufactured at a cost substantially less than structures including expensive and complex hinge, latch, and actuator mechanisms. The structure is capable of a length-to-packing ratio much greater than prior art mechanical systems. The invention overcomes many problems associated with imperfections in prior art mechanical systems. The invention overcomes many problems associated with imperfections in prior art inflatable systems and the resulting structure maintains the proper shape upon deployment. It is not susceptible to leaks or micro-meteoroid punctures and does not require an inflating gas for deployment.

Contrary to conventional wisdom, structural members made of composite materials can thus be designed to bend and even twist to a point below the material's yield point. In this invention, the advantages of open-lattice structures can be fully realized and made foldable for compact storage and self-deployment since the longitudinal composite members are made bendable and the diagonal composite members are made both bendable and twistable.

Once such a structure is fabricated, it can be folded or rolled into a compact shape for storage during deployment and then once in position in space released whereupon the structure resurrects itself automatically to the exact shape it was before folding to deploy solar sails, heat shields, communications devices, power generation devices, and the like.

Figure 13:
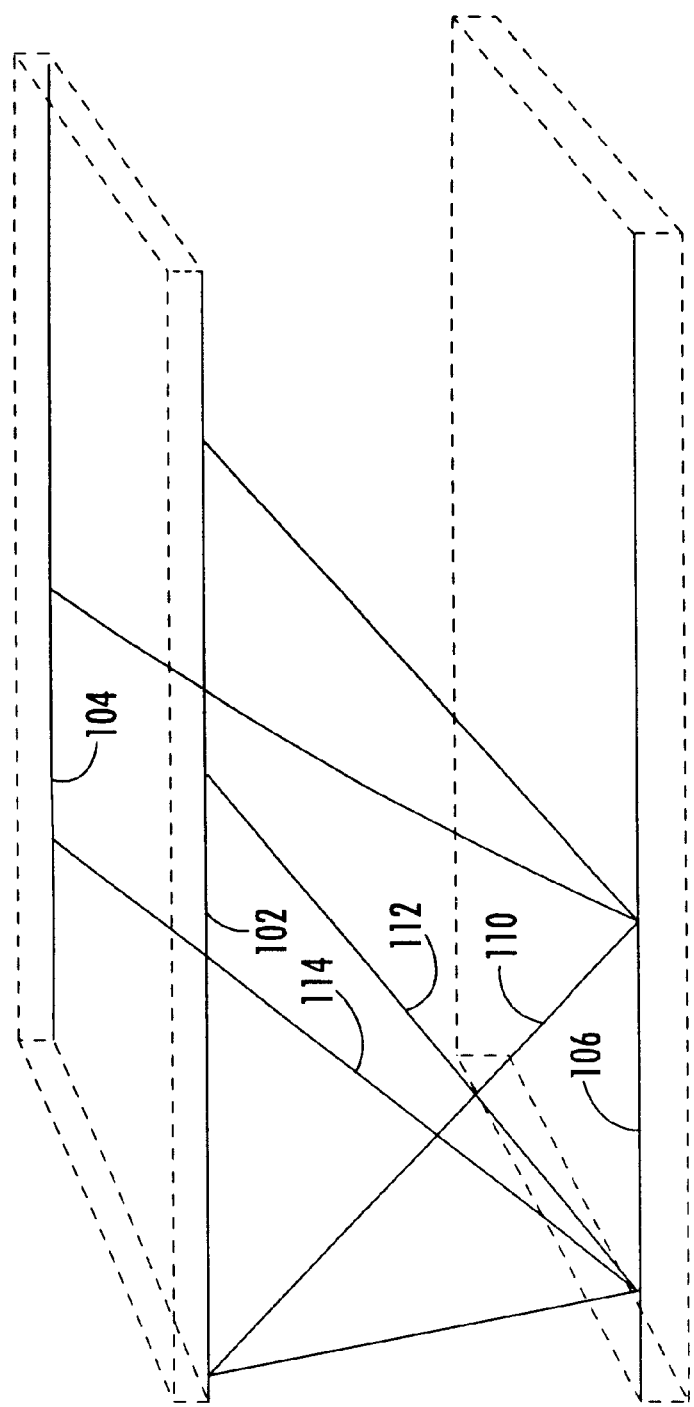
FIG. 13 is a schematic view of a three-dimensional lattice truss structure in accordance with the subject invention.
Figure 16:
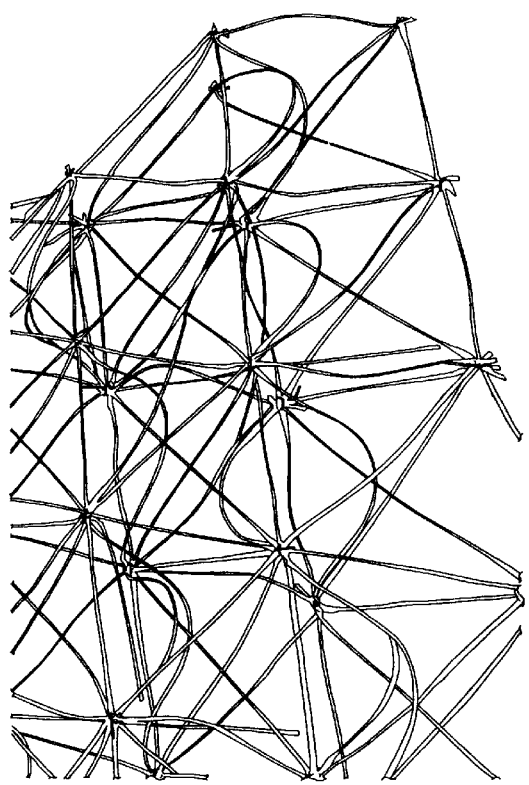
FIGS. 16–17 are views of the structure shown in FIGS. 14–15 folded flat in accordance with this invention.
Figure 17:
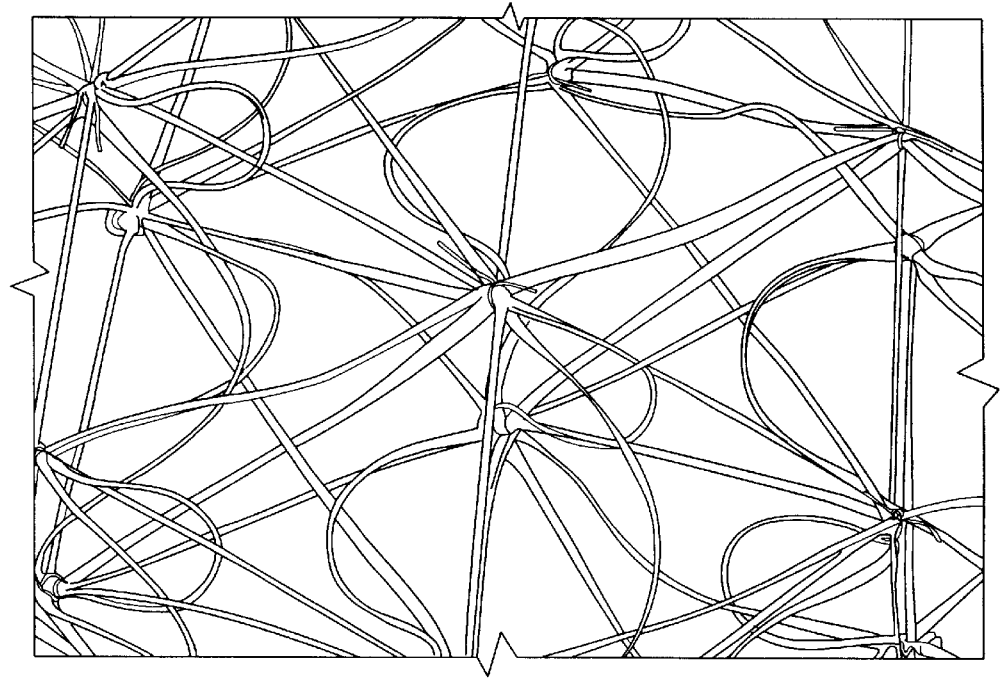

The structure of the subject invention can also be used in fields other than space structures, for example foldable booms or tubes or trusses used in rescue and other operations. Moreover, the structure need not be a column. Thus, truss structure 100, FIGS. 13–15 includes longitudinal members 102, 104, 106 etc. and diagonal members 110, 112, 114, etc. as shown in accordance with this invention. As shown in FIGS. 16 and 17, truss structure 100 can be folded flat for deployment. Other shapes can also be made in accordance with this invention including tubes with a polygon cross section and lengthy members with a triangular cross section.

Thus far, the longitudinally running members have been shown to have a flat cross section. The moment of inertia for such a member is a function of its thickness cubed. Were the thickness of the longitudinal members increased, the moment of inertia would be much higher. However, increasing the thickness of a flat tape limits its ability to bend without failure of the material. The invention therefore curves the flat tapes to make the effective member thickness much greater than the actual thickness of the tape material.

Figure 18:
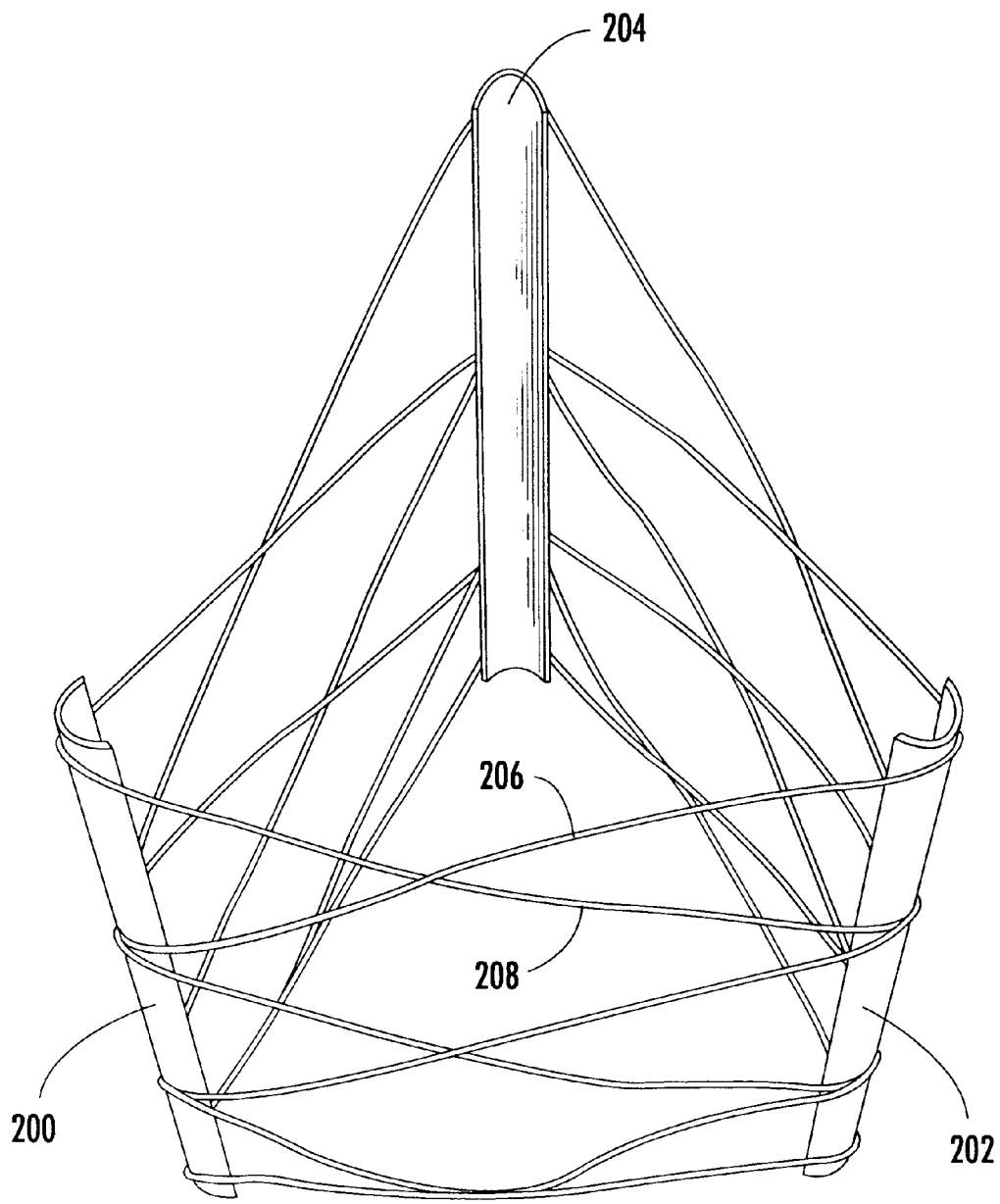
FIG. 18 is a schematic view of a truss structure in accordance with this invention wherein the longitudinal members have a curved cross section.

In FIG. 18, the cross section of longitudinal members 200, 202, and 204 each have a curved cross section which results in a thickness greater than the thickness of a flat member. The result is longitudinal members with a much higher moment of inertia and thus much higher in strength.

In addition to increasing the cross sectional moment of inertia, the increase in effective thickness also greatly reduces the effects of manufacturing imperfections in the material. The reduction in effective modulus and thus Euler buckling strength due to imperfection is given as $$\frac{1}{1+6\left(\frac{E}{t_{eff}}\right)^2} \tag{1}$$

where E is the imperfection size and $t_{eff}$ is the effective thickness of the member. For example, for a flat tape 0.75 inches wide and 0.005 inches thick, with an imperfection of 0.010 inches, the stiffness and strength are reduced by 96%. If the same tape is a curve about a 0.25-inch diameter, the effective thickness becomes 0.125 inches, and for the same imperfection, the stiffness and strength are only reduced by 4%.

Figure 19:
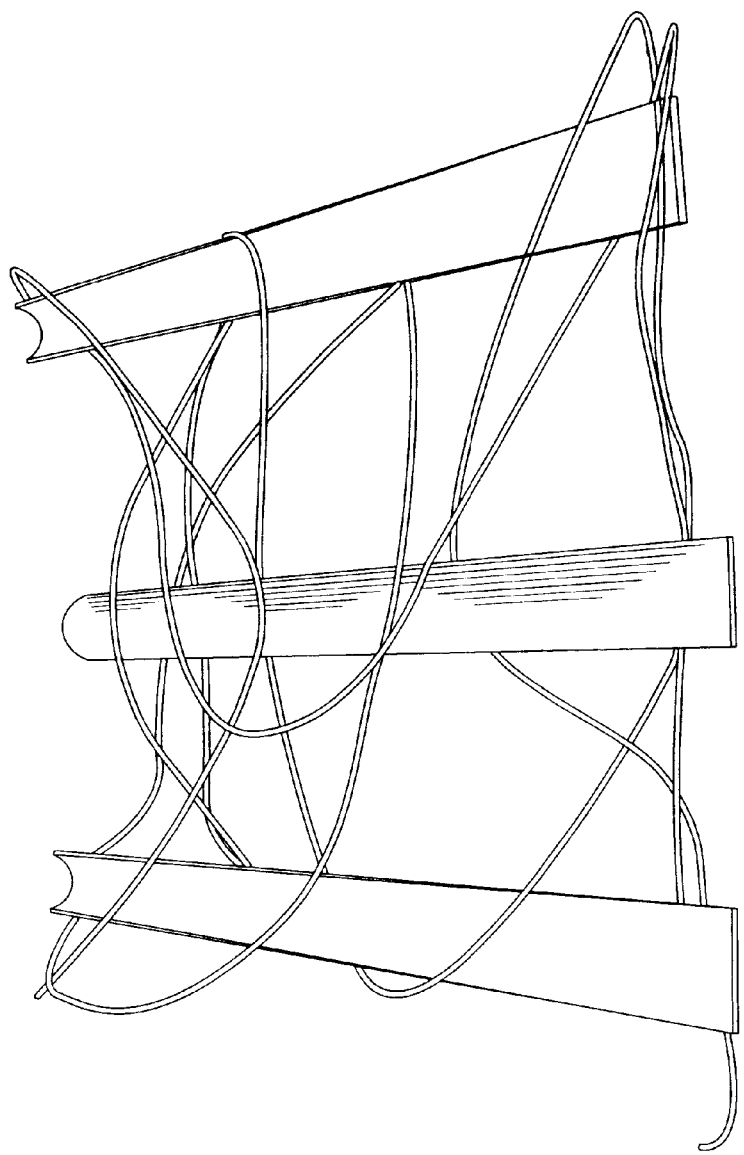
FIG. 19 is a schematic view of truss structure shown in FIG. 18 laid flat and the curved cross section longitudinal members flattened in accordance with this invention.

Longitudinal members 200, 202, and 204 are preferably fabricated from a number of axially running carbon fibers embedded in a thermoplastic resin matrix. In one embodiment, there is only one layer of axially running fibers. In other embodiments, there may be a plurality of such layers. The curved profile may be accomplished by thermoforming a prepeg tape through a die. The diagonal members 206, 208 are then soldered to the convex side of the longitudinal members using heat. Still, curved longitudinal members 200, 202, 204 can bend without yielding and also can be flattened without yielding as shown in FIG. 19 and whereupon the whole structure can be rolled up onto a spool (see FIG. 5).

The resulting deployable truss structure folds compactly to stow and store in a very small volume and then expands to form a truss structure that is very stiff and strong for its weight.

The truss structure is preferably formed of longitudinal members 200, 202, and 204 that are flat tapes that have been curved in cross section. The width thereof and the type and amount of curve is determined by the strength and stiffness needs of the structure. The maximum amount of curvature is determined by the minimum bend ratio of the tape material in the transverse direction and the thickness of the tape. Likewise, the total angle and width of the tape are determined by the stiffness and strength needs of the structure and the yield limits of the material. The individually curved tapes are typically formed into a truss structure by using continuous longitudinal members and discontinuous batten and diagonal members. The truss may be formed of diagonals, longitudinal members and battens, or just longitudinal members and diagonals.

The truss stows by opening up the curvature of each tape until it is flat (see FIG. 19) and then flattening the entire structure. The flattened structure is then wound around a spool for storage. The structure deploys by unfurling off the spool and then expanding back into its original shape. There are two different possible means to stow this structure once it is flattened. It can be rolled around a spool as shown in FIG. 5, or it can be "Z-folded" accordion-style to eliminate the hollow volume of the spool and to further reduce its packaged volume.

Although specific features of the invention are shown in some drawings and not in others, this is for convenience only as each feature may be combined with any or all of the other features in accordance with the invention. Also, other embodiments will occur to those skilled in the art and are within the following claims:

What is claimed is:

1. An open-lattice, foldable, self-deployable structure comprising:
   a plurality of spaced, bendable longitudinally extending members each having a curved cross section;
   a plurality of spaced, bendable and twistable diagonal members disposed to span between and intercept the longitudinal members forming cells, each cell bounded by a portion of two spaced longitudinal members and two spaced diagonal members; and
   means for joining the diagonal members to the longitudinal members at the cell boundary intersections of the diagonal members and the longitudinal members;
   the longitudinal members made of a material which flattens and bends by a predetermined amount below the material's yield point and the diagonal members made of a material which both bends and twists by a predetermined amount below the material's yield point so that the structure can be collapsed and then self-resurrected.

2. The structure of claim 1 in which the longitudinal members and the diagonal members are made of a composite material including fibers in a resin matrix.

3. The structure of claim 1 in which the resin matrix is a thermoplastic material.

4. The structure of claim 1 in which the cells have the shape of triangles.

5. The structure of claim 1 in which the structure is in the shape of a cylinder or prism having a longitudinal axis, the longitudinal members extending along the direction of the longitudinal axis, the diagonal members including one set which extends around the cylinder in a first direction and another set which extends around the cylinder in a second direction.

6. The structure of claim 5 in which the longitudinal members are continuous from one end of the cylinder to the other.

7. The structure of claim 5 in which the diagonal members are continuous from one end of the cylinder to the other.

8. The structure of claim 5 in which the cells are triangular in shape, the apexes of each cell each including a portion of two diagonal members intersecting the longitudinal members.

9. The structure of claim 1 in which the means for joining the diagonal members includes an adhesive securing the diagonal members to the longitudinal members.

10. The structure of claim 1 in which the diagonal members and the longitudinal members are made of a material including fibers and the means for joining includes the fibers of a longitudinal member inter-woven with the fibers of a diagonal member.

11. The structure of claim 10 in which the means for joining further includes a resin securing the woven fiber members.

12. The structure of claim 1 in which the means for joining includes a solder joint where the diagonal members join the longitudinal members.

13. The structure of claim 1 in which the longitudinal members are made of fibers in a resin matrix thermoformed to form the curved cross section.

14. The structure of claim 13 in which the fibers are axial fibers.

15. An open-lattice, foldable, self-deployable structure comprising:
    a plurality of spaced, bendable longitudinally extending members each having a curved cross section;
    a plurality of spaced, bendable and twistable diagonal members disposed to span between and intercept the longitudinal members forming cells, each cell bound by a portion of two spaced longitudinal members and two spaced diagonal members;
    the diagonal members joined to the longitudinal members at the cell boundary intersections of the diagonal members and the longitudinal members to form a load carrying structure; and
    the longitudinal members made of a material which bends and flattens by a predetermined amount below the material's yield point and the diagonal members made of a material which both bends and twists by a predetermined amount below the material's yield point so that the structure can be collapsed and then self-resurrected.

16. An open-lattice, foldable, self-deployable structure comprising:
    a plurality of spaced, bendable longitudinally extending members each having a curved cross section;
    a plurality of spaced, bendable and twistable diagonal members disposed to span between and intercept the longitudinal members forming cells, each cell bound by a portion of two spaced longitudinal members and two spaced diagonal members;
    the diagonal members joined to the longitudinal members at the cell boundary intersections of the diagonal members and the longitudinal members to form a load carrying structure; and
    the longitudinal members made of a material which bends by a predetermined amount below the material's yield point and the diagonal members made of a material which both bends and twists by a predetermined amount below the material's yield point so that the structure can be collapsed and then self-resurrected without mechanical hinges or telescoping members.

17. An open-lattice, foldable, self-deployable structure comprising:
    a plurality of spaced, bendable, straight longitudinally extending members each having a curved cross section;
    a plurality of spaced, bendable and twistable diagonal members disposed to span between and intercept the longitudinal members forming cells, each cell bound by a portion of two spaced longitudinal members and two spaced diagonal members;
    the diagonal members joined to the longitudinal members at the cell boundary intersections of the diagonal members and the longitudinal members to form a load carrying structure;
    the longitudinal members made of a material which bends by a predetermined amount below the material's yield point and the diagonal members made of material which bends and twists by a predetermined amount below the material's yield point so that the structure can be collapsed and then self-resurrected; and the longitudinally extending members each including straight fibers running in the load bearing direction.

18. An open-lattice, foldable, self-deployable structure comprising:

a plurality of spaced, bendable longitudinally extending members each having a curved cross section;

a plurality of spaced, bendable and twistable diagonal members disposed to span between and intercept the longitudinal members forming cells, each cell bound by a portion of two spaced longitudinal members and two spaced diagonal members;

means for joining the diagonal members to the longitudinal members at the cell boundary intersections of the diagonal members and the longitudinal members; and the longitudinal members made of a material which bends by as much as 180° without yielding and the diagonal members made of a material which bends by as much as 180° without yielding and which twists by as much as 90° without yielding so that the structure can be collapsed and then self-resurrected.

* * * * *

UNITED STATES PATENT AND TRADEMARK OFFICE
CERTIFICATE OF CORRECTION

PATENT NO. : 6,560,942 B2  Page 1 of 1
DATED : May 13, 2003
INVENTOR(S) : Warren et al.

It is certified that error appears in the above-identified patent and that said Letters Patent is hereby corrected as shown below:

<u>Column 1,</u>
Line 9, insert the following:

-- GOVERNMENT INTEREST
This invention was made with Government support under Contract No. NAS1-01001 awarded by NASA. The Government has certain rights to this invention. --

Signed and Sealed this

Twenty-eighth Day of October, 2003

JAMES E. ROGAN
*Director of the United States Patent and Trademark Office*